United States Patent [19]

McGarraugh

[11] Patent Number: 4,974,471
[45] Date of Patent: Dec. 4, 1990

[54] CONTROLLABLE PINION DIFFERENTIAL DEVICE

[76] Inventor: Clifford B. McGarraugh, Rte. 2, Box 5-A, Perryton, Tex. 79070

[21] Appl. No.: 277,295

[22] Filed: Nov. 29, 1988

Related U.S. Application Data

[63] Continuation of Ser. No. 50,402, May 18, 1987, abandoned.

[51] Int. Cl.⁵ .......................... F16H 1/40; F16H 37/08
[52] U.S. Cl. .......................................... 74/713; 74/675; 74/710
[58] Field of Search ....................... 74/710.5, 710, 713, 74/799, 675, 687, 802, 774; 180/6.44, 6.48, 6.3

[56] References Cited

U.S. PATENT DOCUMENTS

| | | | |
|---|---|---|---|
| 2,132,692 | 1/1938 | Lawrence | 74/710.5 |
| 2,336,911 | 12/1943 | Zimmermann | 74/710 |
| 2,336,912 | 12/1943 | Zimmermann | 74/710 |
| 2,464,275 | 3/1949 | Trofimov | 74/675 |
| 2,861,478 | 11/1958 | Donner | 74/774 X |
| 3,176,546 | 4/1965 | Johnson | 74/378 |
| 3,503,463 | 3/1970 | Lestogue | 180/6.66 |
| 3,519,314 | 7/1970 | Ballard | 180/244 X |
| 3,601,211 | 8/1971 | Finke | 180/6.66 |
| 4,549,448 | 10/1985 | Kittle | 74/710.5 |
| 4,593,358 | 6/1986 | Takeshima et al. | 74/388 PS |
| 4,633,735 | 1/1987 | Sakurai et al. | 74/675 |

*Primary Examiner*—Dwight G. Diehl
*Attorney, Agent, or Firm*—D. A. N. Chase

[57] ABSTRACT

Differential-gearing devices are disclosed in which the differential pinion gears are controlled to induce a speed difference between output shafts, provide a locking and limited slip differential to equalize the speeds of the output shafts or limit their speed difference, provide a clutch for controlling the coupling and uncoupling of an input shaft to an output shaft, and provide a variable speed transmission. These operational modes are implemented by mounting hydraulic motor or pump units on the rotating carrier of the differential apparatus, the pinion gears being fixed to the shafts of the respective units. A controllable external fluid source independent of the carrier is in fluid communication with the units via conduits through the stationary housing of the differential device and the rotating carrier. Fluid flow may be either blocked, limited or unimpeded between the source and the units to effect the desired control of the pinion gears to, in turn, determine the operational mode of the apparatus.

2 Claims, 2 Drawing Sheets

CONTROLLABLE PINION DIFFERENTIAL DEVICE

This application is a continuation of application Ser. No. 050,402, filed May 18, 1987 now abandoned.

This invention relates to the utilization of differential gearing for controlling power transmission in accordance with functions or conditions desired by the operator and, in particular, to a differential-gearing arrangement in which the pinion gears are controlled in a manner to achieve the desired transmission of rotating motion from input to output.

The construction and operation of differentials in vehicle drive trains are well known. In a simple differential two driven ground wheels or tracks are permitted to turn at different speeds in response to unequal loads such as would occur, for example, when the vehicle deviates from a straight course. Independent rotation of the two wheel axles is achieved by the utilization in the differential assembly of freely rotatable pinion gears in mesh with side gears on the wheel axles, the shafts of the pinion gears being mounted in a rotating differential case or carrier which is driven by the propeller shaft that extends, typically, from the transmission. When the output loads are matched, the differential pinion gears are stationary on their axes but rotate with the carrier to drive the two output axles at equal speeds. As the vehicle traverses a turn, the pinion gears spin on their shafts thereby transmitting more rotary motion to one axle than to the other.

In the foregoing example of a simple differential, the pinion gears permit a speed difference in response to the effect of an external load or condition on the traction wheels, such as when a vehicle turns or encounters an inconsistent road surface. In contrast to this conventional usage of the differential principle as a means of responding to load imbalances, in the present invention the pinion gears are advantageously controlled to induce a speed difference, lock the output axles to the input shaft as desired to force the output axles to turn at the same speed, control the coupling and uncoupling of input and output shafts, and provide a controllable speed difference between input and output shafts.

It is, therefore, the primary object of the present invention to provide a differential-gearing device in which the rotation of the differential pinion gears is controlled in order to effect a desired relationship between the rotatably driven input shaft and the output shaft or shafts of the device.

A specific object of the present invention is to provide a device as aforesaid in which the pinion gears are driven in either direction of rotation by motor means on the carrier or differential case, controlled by a power source which does not rotate with the carrier and which enables the operator to control the speed and direction of drive of the pinion gears to induce a corresponding speed difference in the output shafts of the device.

Another specific object of the invention is to provide, in a second embodiment of the aforesaid device, a locking and limited slip differential in which fluid pump units on the carrier have operating shafts to which the respective pinion gears are fixed, and wherein by control of a fluid source for the pump units the lock, limited slip and conventional differential operational modes are achieved.

Still another specific object of the present invention is to provide, in a third embodiment thereof, a clutch apparatus by which input and output shafts may be selectively intercoupled and uncoupled through the use of fluid pump units on the carrier driven by the pinion gears and externally controlled to either permit free rotation of the pinion gears or lock the same against rotation to respectively isolate the input from the output or cause rotating motion to be transmitted to the output shaft.

A further specific object of this invention is to provide, in a fourth embodiment thereof, a variable speed transmission in which the pinion gears of the differential apparatus are controlled by pump units on the carrier and variable displacement fluid motor means on the output shaft of the apparatus in order to impart a desired speed difference between the input and output shafts.

Other objects of this invention will become apparent as the detailed specification proceeds.

DETAILED DESCRIPTION

Figure 1:
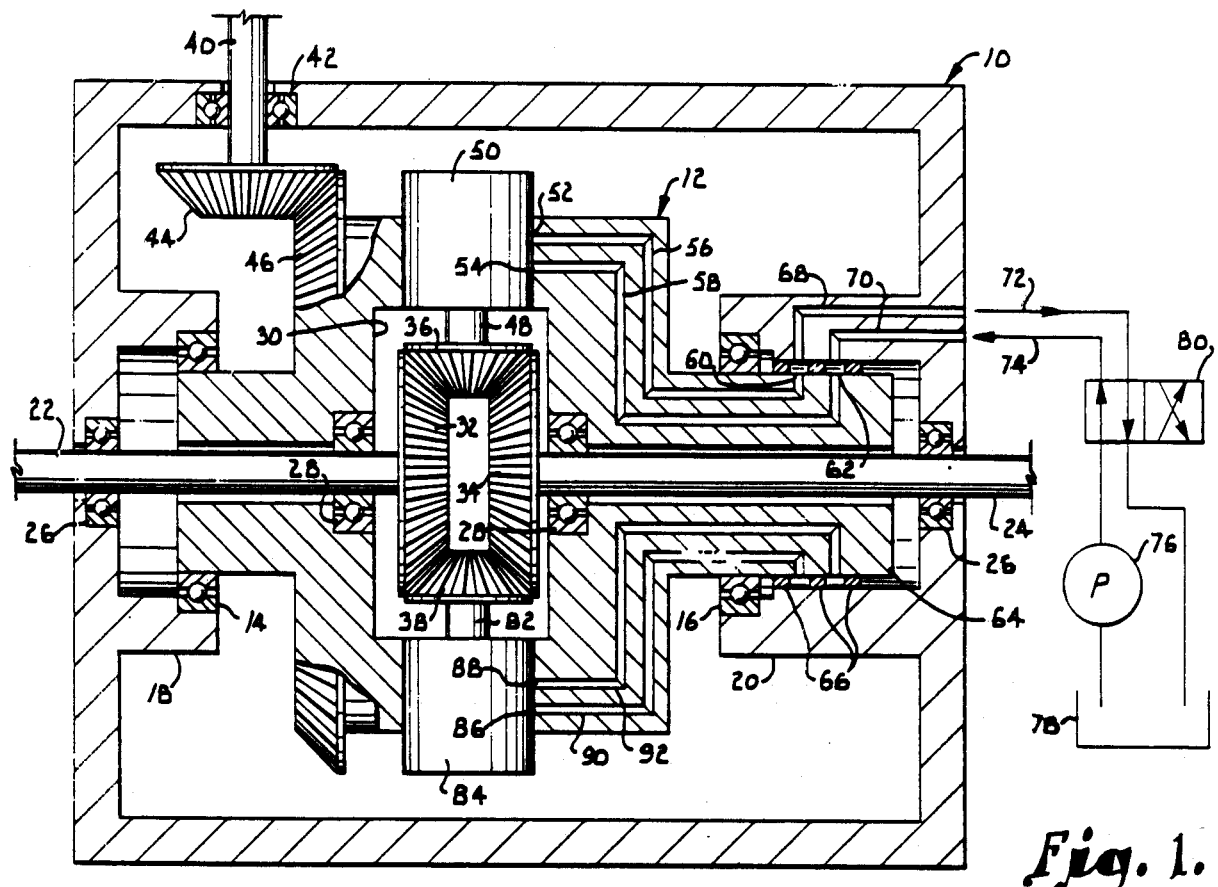
FIG. 1 is a simplified, diagrammatic, cross-sectional view of a differential device of the present invention employing hydraulic motors on the carrier to control the speed and direction of drive of the pinion gears to, in turn, induce a corresponding speed difference in the output shafts.

Referring to FIG. 1, a housing 10 contains a differential case or carrier 12 supported therein on bearings 14 and 16 carried by opposed, internally projecting, hollow boss portions 18 and 20 respectively of the housing 10. The carrier 12 is rotatable about an axis that is coaxial with respect to left and right output shafts or axles 22 and 24 which extend from housing 10 and are journaled in bearings 26 in the wall of the housing and bearings 28 in the carrier 12. The inner ends of the output shafts 22 and 24 are closely spaced from each other and terminate at a central chamber 30 within the carrier 12, and are provided with bevel side gears 32 and 34, respectively, in mesh with a pair of opposed, differential pinion gears 36 and 38.

An input shaft 40 forming, for example, part of the power train of a vehicle extends, typically, from the vehicle transmission and into the housing 10 through a bearing 42, the end of the input shaft 40 being provided with a drive pinion 44 in mesh with a ring gear 46 fixed to the carrier 12 and coaxial with the opposed output shafts 22 and 24. Accordingly, the components thus far described comprise a conventional bevel-gear differential for transmitting and distributing the rotating motion of the input shaft 40 to the two output shafts 22 and 24.

In the present invention, however, the pinion gear 36 is fixed to the end of the drive shaft 48 of a hydraulic motor 50 mounted in the wall of the carrier 12 and rotatable therewith. As may be appreciated from viewing FIG. 1, the wall of the carrier 12 surrounding the chamber 30 is suitably bored or recessed to receive and retain the hydraulic motor 50. The fluid inlet and outlet 52, 54 of the hydraulic motor 50 are communicated by channels 56, 58 within the carrier body to corresponding ports 60, 62 on the circumferential periphery of a reduced, cylindrical end portion 64 of carrier 12 that is received within the boss 20 and supported by bearing 16. Three axially-spaced, annular seals 66 are sandwiched between the outer, circumferential surface of end portion 64 and the opposing inner surface of boss 20 and disposed, as seen in FIG. 1, between and on both sides of the ports 60 and 62. For example, O-rings seated in grooves (not shown) in the boss 20 may be employed as the seals 66. Accordingly, an annular space between adjacent seals 66 is formed at each port 60 and 62 to provide continuous fluid communication of these ports with an external fluid source during rotation of the carrier 12. Channels 68 and 70 in boss 20 extend from the annular spaces thus created to the outside of the housing 10 where hydraulic lines 72 and 74 communicate channels 68 and 70, respectively, with a hydraulic pump 76 and a reservoir 78 via a two-way valve 80. Although valve 80 is diagrammatically illustrated as a simple valve for reversing fluid flow in the lines 72 and 74, it should be understood that in practice the valve 80 would be provided with a variable orifice or other means of controlling fluid flow so that the volume of the fluid flow, as well as its direction, will be under the control of the operator.

Likewise, the pinion gear 38 is fixed to the shaft 82 of a hydraulic motor 84 having a fluid inlet and outlet 86, 88 communicated by respective channels 90, 92 in housing 12 with the corresponding annular spaces defined by the three seals 66. The pinion gears 36 and 38 can be driven in either direction, depending upon the direction of fluid flow as governed by the valve 80. In either operational condition, the opposing pinion gears 36 and 38 rotate in opposite directions. Accordingly, utilization of the differential of FIG. 1 in tracked vehicles provides direct control of the relative speeds of the two output axles for steering purposes without the need to employ a complex drive or to declutch and apply a brake to the track on the inside of a turn.

Figure 2:
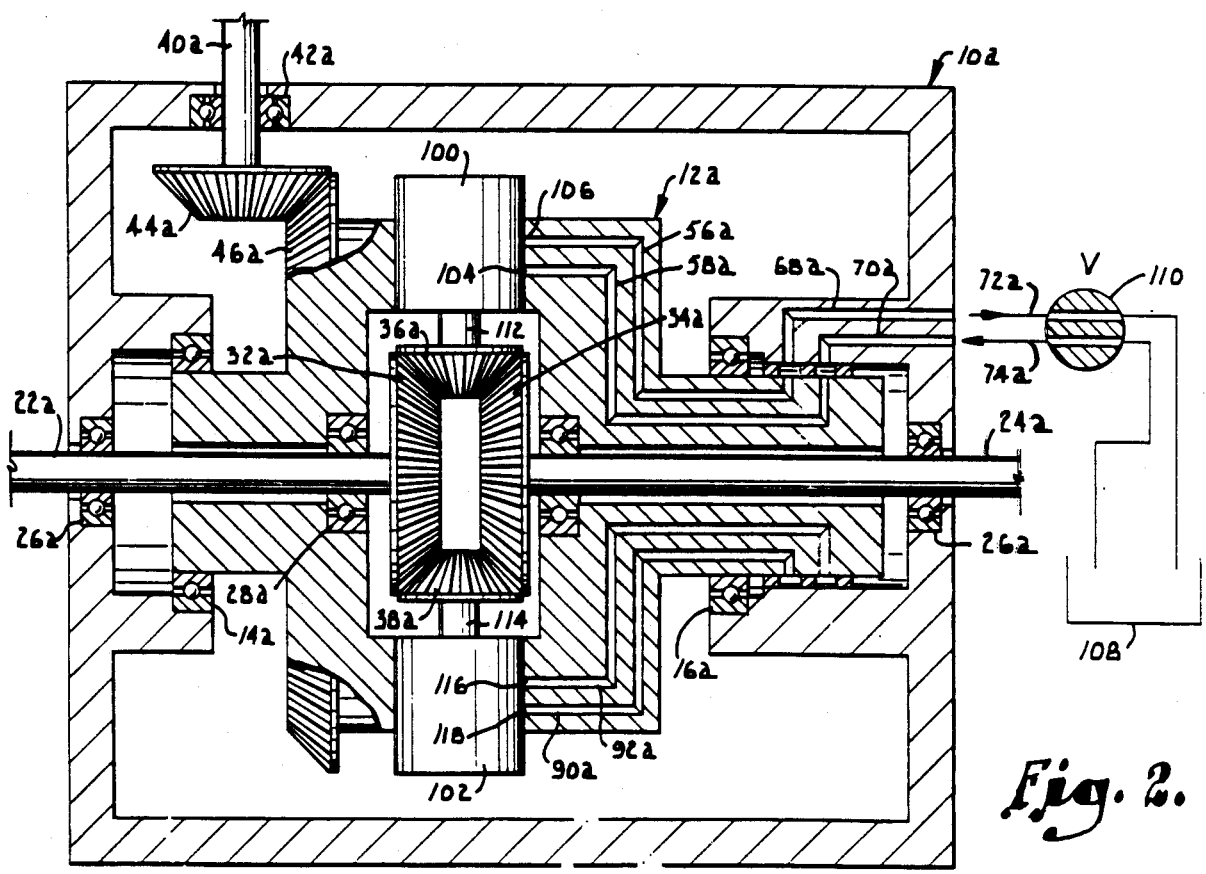
FIG. 2 is a view similar to FIG. 1 but showing a second embodiment of the present invention in which the controlled pinions provide a locking and limited slip differential through the use of hydraulic pump units on the carrier connected with the pinion gears.

Referring to the embodiment of FIG. 2, the differential-gearing device there shown is structurally identical to the embodiment of FIG. 1 except for the substitution of hydraulic pump units 100 and 102 for the hydraulic motors 50 and 84 respectively, and a modification of the external hydraulic system. Accordingly, the same reference numerals are utilized in FIG. 2 to designate like parts and components, with the addition of the "a" notation. The embodiment of FIG. 2 provides a locking and limited slip differential for wheeled vehicles where, under adverse traction conditions, it is desired to have the capability of forcing the output shafts 22a and 24a to rotate at the same speed or limit the speed difference therebetween.

The hydraulic pump units 100 and 102 are positive displacement pumps in which control of fluid flow results in control of the pinion gear motion. Pump unit 100 has an oil inlet 104 and an outlet 106 communicating with external hydraulic lines 74a and 72a which extend to a reservoir 108 via a valve 110 under the control of the operator. The pinion gear 36a is fixed to the operating shaft 112 of pump unit 100; likewise, the pinion 38a is fixed to the operating shaft 114 of pump unit 102. The hydraulic lines 72a and 74a, via channels 68a, 70a and 90a, 92a, extend to the oil outlet 118 and inlet 116 of pump unit 102. When the valve 110 is in the open position illustrated, the pump shafts 112 and 114 (and hence the pinion gears 36a and 38a) are allowed to rotate freely as fluid flow to and from the reservoir 108 is unimpeded. In this mode, therefore, the speed of output shafts 22a and 24a is allowed to vary independently. However, upon closure of the valve 110, fluid flow in the hydraulic system is blocked and the hydraulic pumps 100 and 102 are locked to force the output shafts 22a and 24a to rotate at the same speed. It may be appreciated that partial opening of the valve 110 restricts the fluid flow from the pumps 100 and 102 and thus limits the speed variation between the two output shafts 22a and 24a.

Figure 3:
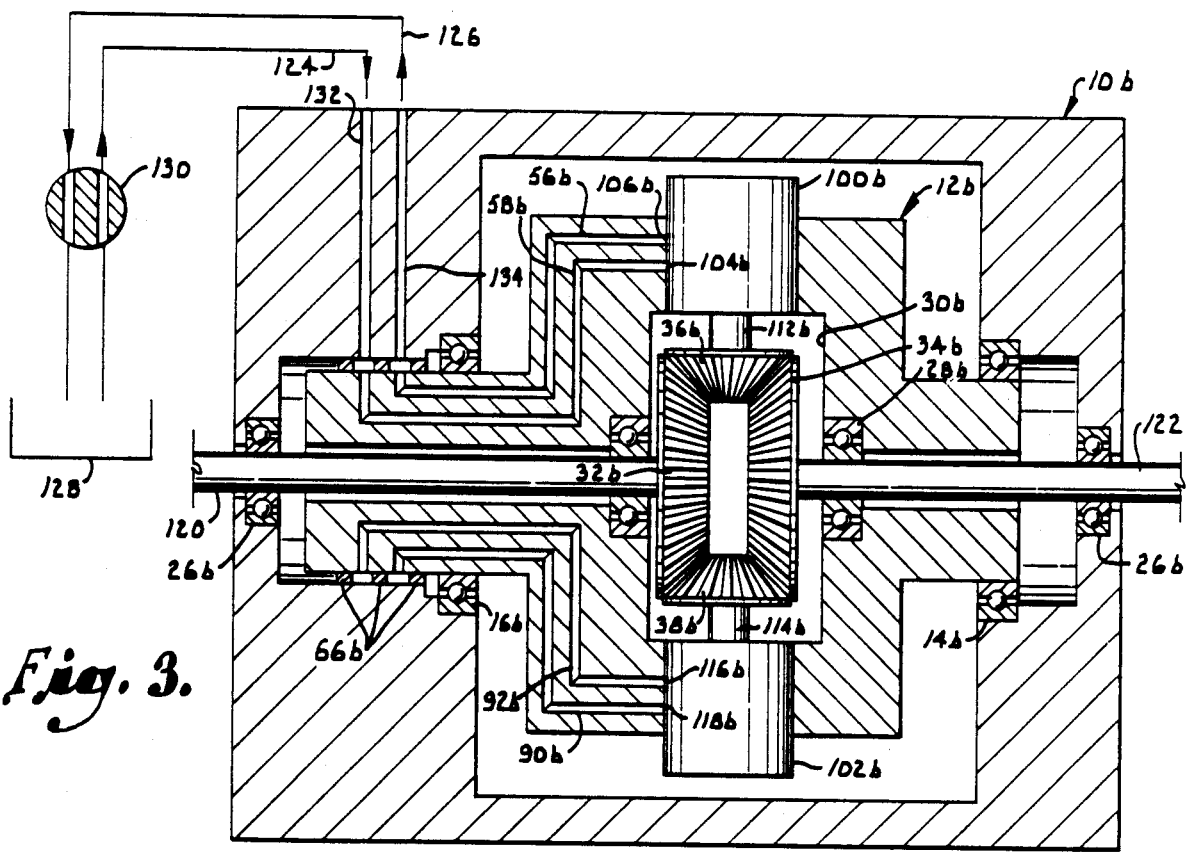
FIG. 3 is a view similar to FIG. 1 but showing a third embodiment of the present invention in which the aligned shafts coaxial with the carrier provide the input to and the output from the device, the arrangement in this embodiment providing a hydraulic clutch for controlling the transmission of rotating motion from the input shaft to the output shaft.
Figure 4:
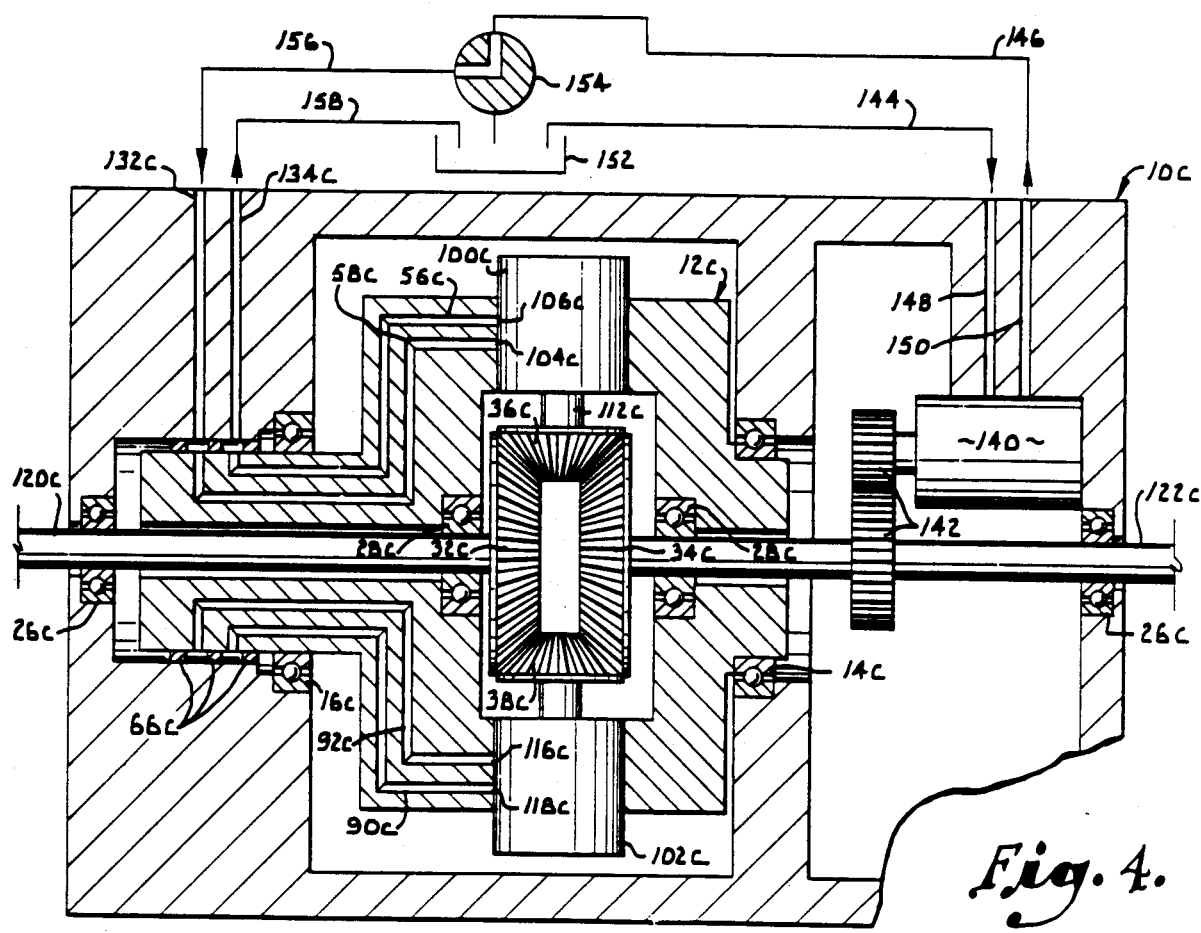
FIG. 4 is a view similar to FIG. 3 but showing a fourth embodiment of the present invention in which the differential device provides a variable speed transmission.

It should be understood that any number of pinion gears may be employed in the differential assembly of FIG. 2 and in the other embodiments of FIGS. 1, 3 and 4. In light duty applications it may not be necessary to control all of the pinion gears, thus some may be left to rotate freely.

Referring to FIG. 3, this embodiment of the invention provides a hydraulic clutch for controlling the transmission of rotative motion from an input shaft 120 to an output shaft 122 coaxially aligned therewith. Other than right to left reversal and a modification in the interior configuration of the housing 10b, the differential-gearing arrangement and control of the pinion gears are identical to that shown in FIG. 2 except for the arrangement of the input and output shafts of the device. It may be seen that the drive pinion and ring gear are omitted and that the input is supplied by the shaft 120 which has its inner end fixed to the bevel side gear 32b. The opposing, inner end of the output shaft 122 carries the bevel side gear 34b. Other parts and components identical to that described or illustrated in FIG. 2 are identified by the same reference numerals with the addition of the "b" notation.

External hydraulic lines 124 and 126 communicate with a reservoir 128 via a valve 130, and extend to passages 132 and 134, respectively, in housing 10b that, in turn, communicate via the rotating fluid coupling with the oil inlets 104b, 116b and outlets 106b, 118b of the hydraulic pump units 100b and 102b. Each of the pump units 100b and 102b is a positive displacement piston pump driven by the corresponding pinion gear 36b or 38b. When the valve 130 is open as illustrated, fluid flows freely between the reservoir 128 and the pump units 100b and 102b; thus, the pinion gears 36b and 38b rotate in response to the input shaft 120 and rotation is not transmitted to the output shaft 122. Closure of the valve 130 blocks fluid flow and locks the pump units 100b and 102b to thereby prevent rotation of the pinion gears 36b and 38b and transmit rotating motion to the output shaft 122.

The embodiment of FIG. 4 employs the principles of the present invention to provide a variable speed transmission. The differential gearing arrangement is identical to that illustrated in FIG. 3, corresponding parts and components being identified by the same reference numerals with the addition of the "c" notation. The embodiment of FIG. 4 differs from FIG. 3 in that a variable displacement hydraulic motor 140 is mounted within the housing 10c but is separate from the rotatable carrier 12c. The output shaft of hydraulic motor 140 is connected by spur gears 142 to output shaft 122c, external hydraulic lines 144 and 146 being communicated with motor 140 via passageways 148 and 150 respectively in housing 10c. Hydraulic line 144 communicates with a reservoir 152, whereas line 146 communicates with passage 132c via a valve 154 and line 156. A hydraulic line 158 extends from passage 134c to the reservoir 152. The transmission is disengaged (drive removed from output shaft 122c) when the valve 154 is shifted to a position communicating line 156 with reservoir 152, thereby removing the hydraulic motor 140 from the hydraulic system and rendering the pinion gears 36c and 38c freely rotatable as in FIG. 3 (declutched condition).

OPERATION

The differential with axle speed control of FIG. 1 may be advantageously utilized to steer a tracked vehicle as previously discussed. When the input shaft 40 is in motion, the direction of fluid flow in the hydraulic lines 72 and 74, as governed by the position of the valve 80, determines which axle or output shaft 22 or 24 has the highest speed. The volume of fluid flow determines the speed difference between the two axles and, therefore, the rate at which the turn is executed.

When the input shaft 40 is stopped, as would occur with the drive disengaged, the output shafts 22 and 24 will turn in opposite directions as governed by the direction of fluid flow in the lines 72 and 74. Again, the volume of fluid flow will determine the speed difference between shafts 22 and 24. This enables a tracked vehicle to turn in place while stopped.

With respect to the locking and limited slip differential provided by the embodiment of FIG. 2, it may be seen that the substitution of hydraulic pumps 100 and 102 for the hydraulic motors 50 and 84 utilized in FIG. 1, and modification of the external hydraulic system, provide a means of locking the output shafts 22a and 24a under difficult traction conditions such as icy roadways. As the embodiment of FIG. 2 is primarily intended for wheeled vehicles, steering is accomplished in the conventional manner. It should be appreciated that in both the embodiments of FIGS. 1 and 2, as well as FIGS. 3 and 4, continuous hydraulic connections are effected to the rotating carrier through the utilization of the seals 66 that define annular spaces between the stationary and rotating parts of the device.

The hydraulic clutch of FIG. 3 is engaged by operating the valve 130 to block the fluid flow in the lines 124 and 126, thereby freezing the piston pumps 100b and 102b to prevent rotation of the pinions 36b and 38b. The output shaft 122 under such condition is forced to rotate with the input shaft 120 by virtue of the interengagement of the pinion gears and the side gears 32b and 34b. If valve 130 is partially closed rather than fully closed, restricted fluid flow to and from the reservoir 128 will permit a degree of rotation of the pinion gears 36b and 38b and thus drive the output shaft 122 but at a slower speed than the input shaft 120.

In the variable speed transmission of FIG. 4, both the valve 154 and the variable displacement hydraulic motor 140 are under the control of the operator. The hydraulic motor 140 may, for example, comprise a piston-type motor having a displacement that is varied by changing the length of the stroke of the pistons, and would typically be varied by a hand-control lever (not shown). The transmission of FIG. 4 operates much in the same manner as the clutch of FIG. 3 with the addition of the motor 140 which permits control of the speed of the output shaft 122c and increases efficiency when the output speed is less than the speed of the input shaft 120c.

The function of the variable displacement motor 140 is to control the volume of fluid flow in the hydraulic system that includes the two pump units 100c and 102c connected to the pinion gears 36c and 38c. At high displacement, which is high fluid flow, the output speed is lower than the input speed. When the displacement is reduced to zero, fluid flow stops, the pinion gears are locked and output speed equals input speed. Accordingly, by varying the displacement of the motor 140 between zero and maximum, the ratio of the speed of the output shaft 122c to the speed of the input shaft 120c is controlled and may be selected as operating conditions dictate.

Having thus described the invention, what is claimed as new and desired to be secured by Letters Patent is:

1. A differential-gearing steering apparatus for inducing an operator-controlled speed difference between a pair of output axles in the drive train of a vehicle, said apparatus comprising:

an input shaft of said drive train;

a carrier coupled to said input shaft and carrying a pair of rotatable, opposed pinion gears;

means mounting said carrier for rotation about a predetermined axis in response to motion of said input shaft;

a pair of output shafts presenting said axles, each of said output shafts having an inner end provided with gear means engaging said pinion gears;

a pair of hydraulic motor units on said carrier for independently rotating said pinion gears in opposite directions, each of said motor units having a rotatable drive shaft connected with a corresponding pinion gear;

a controllable power source for said motor units external to said carrier and independent of rotation thereof for controlling the speed and direction of drive of said motor units, said source including a fluid supply and means for controlling the direction and volume of fluid flow from said source to said motor units;

said means for controlling fluid flow including selectively operable valve means having first and second operational conditions corresponding to forward and reverse directions of flow of said fluid; and means connecting said source with said motor units, whereby the speed and direction of drive of the units, and hence the pinion gears, may be selected to induce a corresponding speed difference in the output shafts to steer the vehicle.

2. The apparatus as claimed in claim 1, wherein said means mounting said carrier includes a housing that is stationary with respect to said carrier, said fluid supply being external to said housing, and wherein said connecting means includes fluid conduit means from said fluid supply to said motor units having means presenting continuous fluid connections to the rotatable carrier through the stationary housing.

* * * * *